(12) United States Patent
Li et al.

(10) Patent No.: US 11,066,155 B2
(45) Date of Patent: Jul. 20, 2021

(54) UNMANNED AERIAL VEHICLE

(71) Applicant: Shu Zong, Heilongjiang (CN)

(72) Inventors: Yepeng Li, Heilongjiang (CN); Shu Zong, Heilongjiang (CN); Minglei Li, Heilongjiang (CN)

(73) Assignee: Shu Zong, Heilongjiang (CN)

( * ) Notice: Subject to any disclaimer, the term of this patent is extended or adjusted under 35 U.S.C. 154(b) by 264 days.

(21) Appl. No.: 16/173,571

(22) Filed: Oct. 29, 2018

(65) Prior Publication Data
US 2019/0291858 A1 Sep. 26, 2019

(30) Foreign Application Priority Data
Mar. 23, 2018 (CN) .......................... 201810247034.9

(51) Int. Cl.
*B64C 27/20* (2006.01)
*B64C 27/08* (2006.01)

(52) U.S. Cl.
CPC .............. *B64C 27/20* (2013.01); *B64C 27/08* (2013.01); *B64C 2201/024* (2013.01); *B64C 2201/042* (2013.01); *B64C 2201/088* (2013.01); *B64C 2201/108* (2013.01); *B64C 2201/162* (2013.01)

(58) Field of Classification Search
CPC ... B64C 27/20; B64C 27/08; B64C 2201/088; B64C 2201/108; B64C 2201/162; B64C 2201/027; B64C 39/024; B64C 39/00; B64D 27/20
See application file for complete search history.

(56) References Cited

U.S. PATENT DOCUMENTS

| 3,632,065 A | * | 1/1972 | Rosta | B64C 27/20 244/17.11 |
| 2007/0034734 A1 | * | 2/2007 | Yoeli | B64C 27/20 244/12.1 |
| 2017/0029097 A1 | * | 2/2017 | Matsumoto | B64D 47/04 |
| 2018/0063429 A1 | * | 3/2018 | Enriquez | G03B 17/08 |
| 2019/0002093 A1 | * | 1/2019 | Muramatsu | B64B 1/60 |

FOREIGN PATENT DOCUMENTS

| CN | 202244078 U | 5/2012 |
| CN | 104973243 A | 10/2015 |
| CN | 106882368 A | 6/2017 |
| KR | 101668643 B1 | 10/2016 |
| WO | 2006112578 A1 | 10/2006 |

* cited by examiner

*Primary Examiner* — Brian M O'Hara
*Assistant Examiner* — Keith L Dixon
(74) *Attorney, Agent, or Firm* — Dorsey & Whitney LLP

(57) ABSTRACT

An unmanned aerial vehicle includes a housing assembly having a receiving space, a power assembly received in the receiving space, and a controlling assembly received in the receiving space and configured to control the power assembly. The housing assembly is provided with a flow passage penetrating an inside of the housing assembly, and the power assembly partially forms the flow passage. In the UAV, since the power assembly is mounted in the housing assembly, the propeller of the power assembly will not hurt person during the flight, thereby improving the safety performance while flying near the ground.

9 Claims, 6 Drawing Sheets

UNMANNED AERIAL VEHICLE

CROSS-REFERENCE TO RELATED APPLICATION

This application claims priority to Chinese Patent Application No. 201810247034.9, filed on Mar. 23, 2018, the entire contents of which are incorporated herein in its entirety.

TECHNICAL FIELD

The present disclosure relates to an aircraft technical field, and particularly relates to an unmanned aerial vehicle.

BACKGROUND

Unmanned aerial vehicle (UAV) is an unmanned aircraft that controlled by a remote control or its own computer program to achieve flight, and it can be broadly applied in aerial photography, agriculture, logistics, monitoring, and other fields. Nowadays, the UAV technology is flourishing in China.

When a conventional UAV is used in a narrow space, since the propeller rotating at a high speed is exposed to the outside, it could easily cause a property damage or a personal injury. Therefore, not only the personal safety is threatened, but the application of the UAV in some scenarios is limited.

SUMMARY

Accordingly, it is necessary to provide a UAV that is capable of flying near the ground and guaranteeing the personal safety.

A UAV includes a housing assembly having a receiving space; a power assembly received in the receiving space; and a controlling assembly received in the receiving space and configured to control the power assembly. The housing assembly is provided with a flow passage vertically penetrating an inside of the housing assembly, and the power assembly partially forms the flow passage.

In the UAV according to present disclosure, since the power assembly is mounted in the housing assembly, the propeller of the power assembly will not hurt person during the flight, thereby improving the safety performance while flying near the ground.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

NUMERAL REFERENCE LIST

Figure 1:
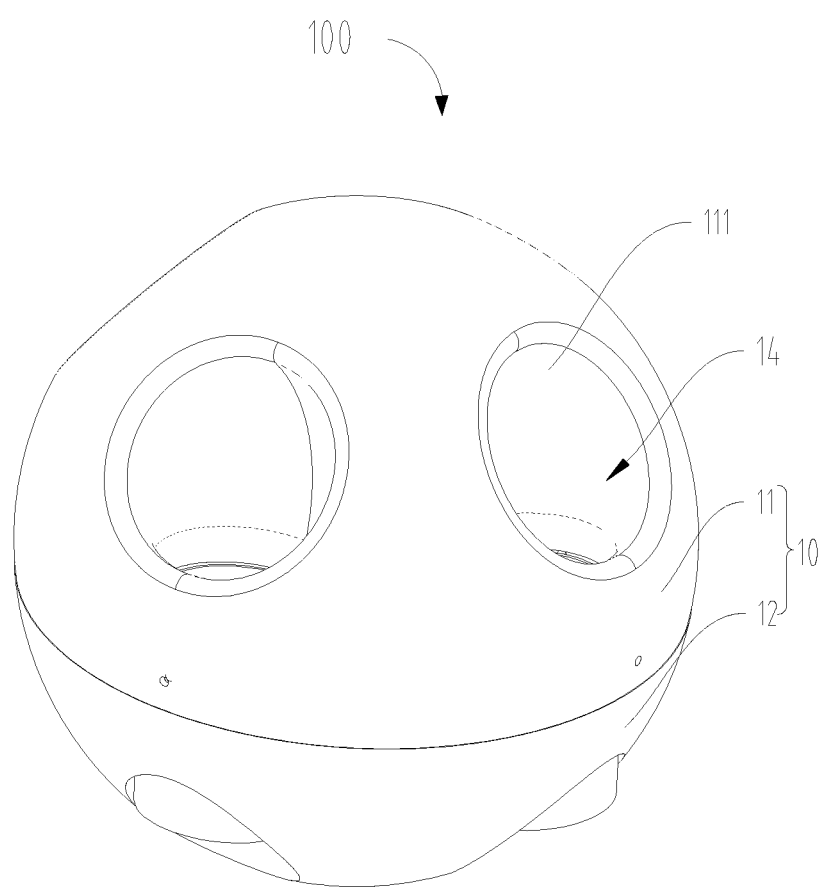
FIG. 1 is a perspective view of a UAV according to an embodiment.

UAV 100
housing assembly 10
first housing 11
first duct 111
through hole 112
receiver hole 113
infrared induction hole 114
second housing 12
second duct 121
protrusion 122
through hole 123
switch 124
power interface 125
receiving space 13
flow passage 14
fixing board 15
power assembly 20
propeller 21
frame 211
nozzle 212
driving element 22
controlling assembly 30
distribution board 31
flight controller 32
electronic speed control device 33
positioning device 34
battery 35
receiver 36
infrared sensor 37

DETAILED DESCRIPTION OF THE EMBODIMENTS

Embodiments of the present disclosure are described more fully hereinafter with reference to the accompanying drawings. A preferred embodiment is described in the accompanying drawings. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

It will be understood that when an element is referred to as being "fixed" to another element, it can be directly fixed to the other element or intervening elements may be present. Also, when an element is referred to as being "mounted" or "provided" on another element, it can be directly mounted or provided on the other element or intervening elements may be present.

Unless otherwise defined, all terms (including technical and scientific terms) used herein have the same meaning as commonly understood by one of ordinary skill in the art to which this invention belongs. The terms used herein is for the purpose of describing particular embodiments only and is not intended to limit the present disclosure. As used herein, the term "and/or" includes any and all combinations of one or more of the associated listed items.

Figure 2:
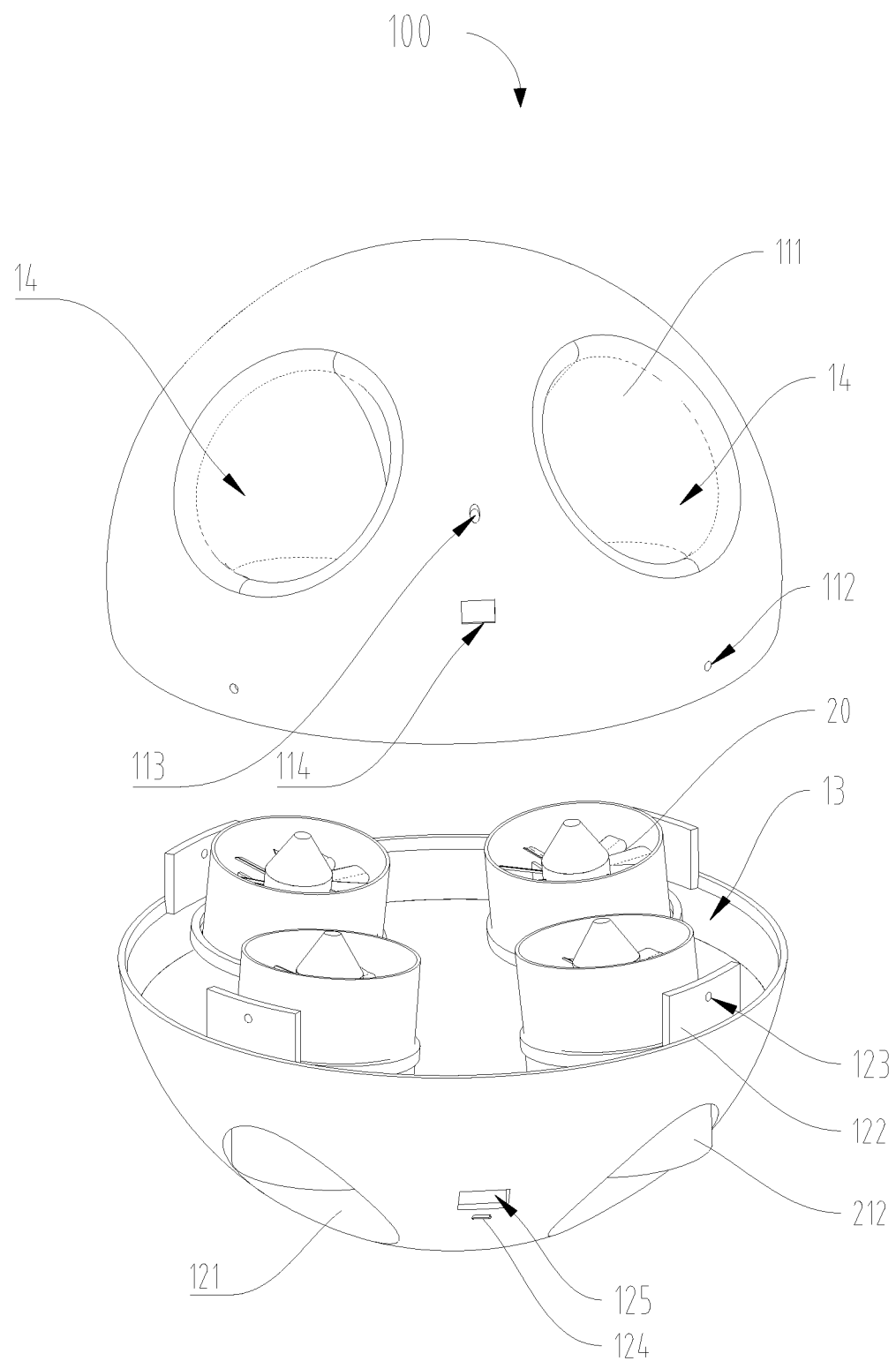
FIG. 2 is an exploded, perspective view of the UAV of FIG. 1.
Figure 3:
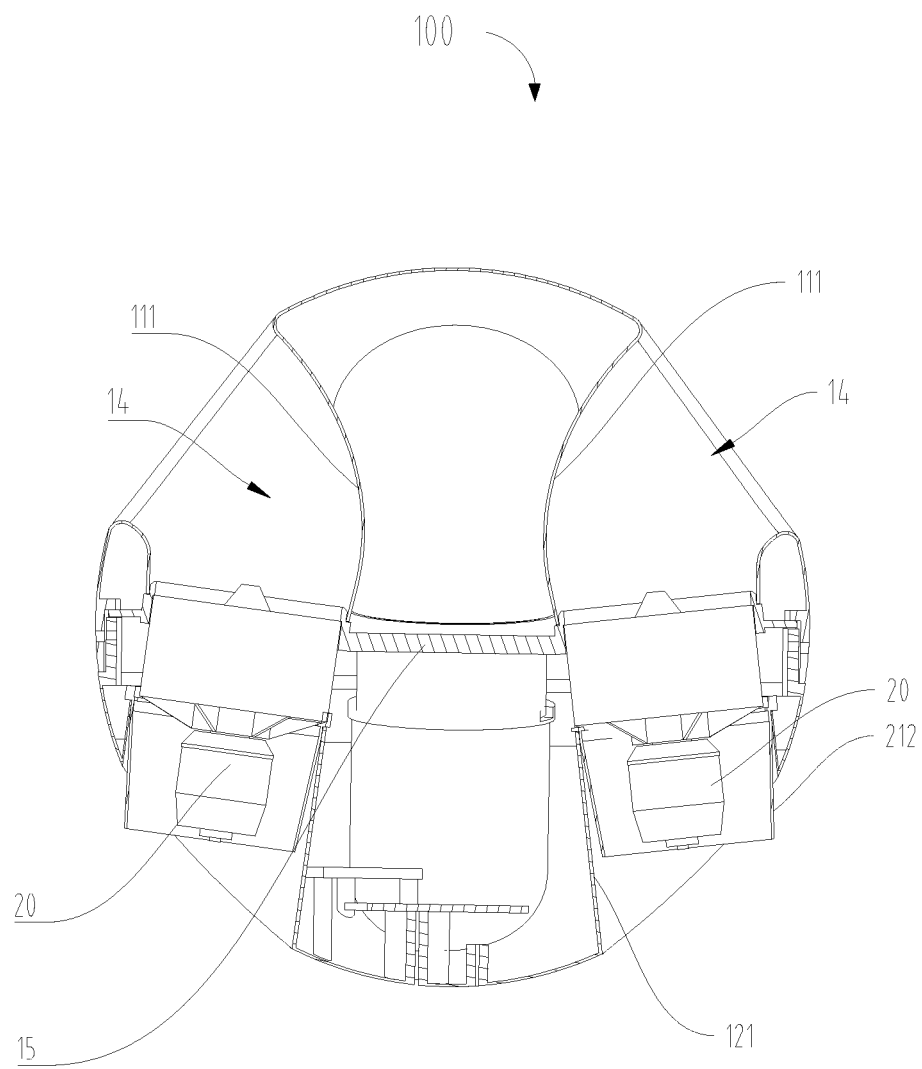
FIG. 3 is a cross-sectional view of the UAV of FIG. 1.
Figure 4:
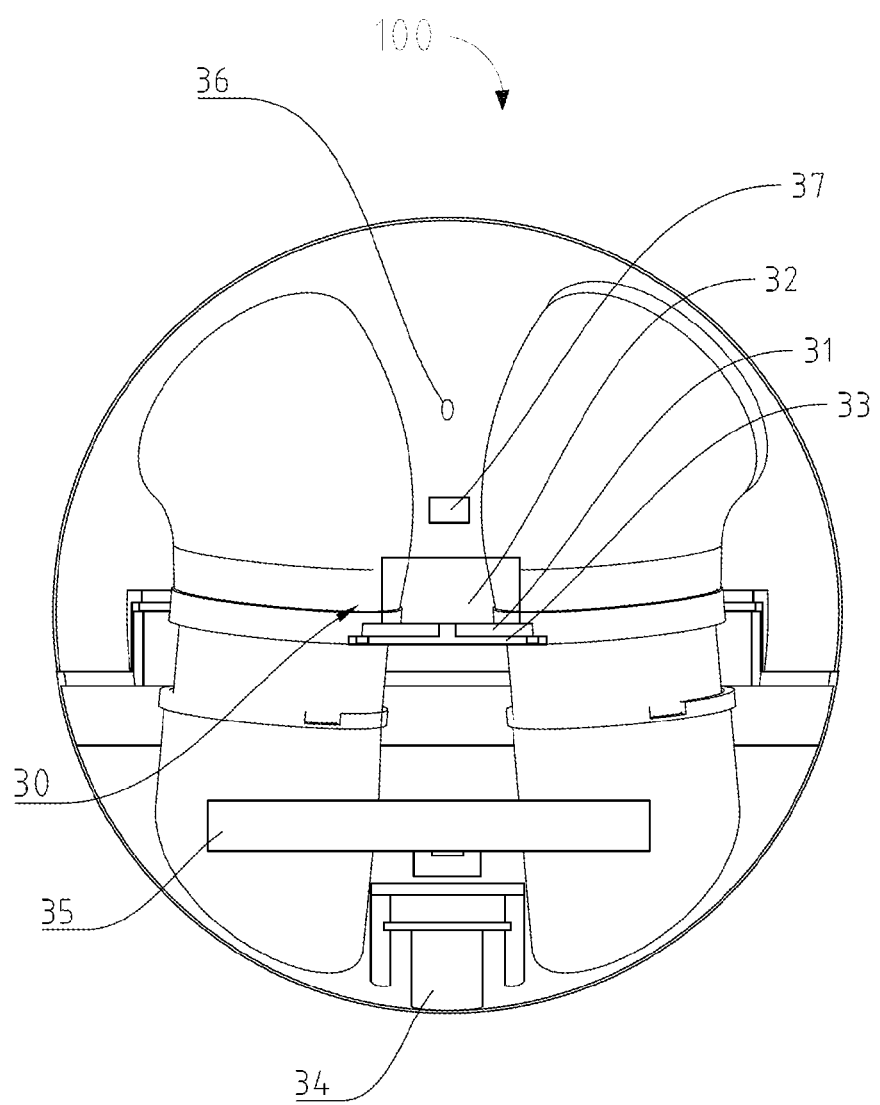
FIG. 4 is a partial sectional view of the UAV of FIG. 1.

Referring to FIG. 1 to FIG. 4, FIG. 1 is a perspective view of a UAV 100 according to an embodiment. FIG. 2 is an exploded, perspective view of the UAV 100 of FIG. 1, FIG. 3 is a cross-sectional view of the UAV 100 of FIG. 1, and FIG. 4 is a partial sectional view of the UAV 100 of FIG. 1. UAV is an unmanned aircraft that controlled by a remote control or its own computer program to achieve flight, which has broad application prospects in both military and civilian applications. The UAV 100 according to the illustrated embodiment is applied in a field of aerial photography technology. It is to be understood that, the UAV 100 can also be applied in other technical fields such as housework, education, social, monitoring, toy, and the like. Moreover, the UAV 100 according to the illustrated embodiment can be introduced into the field of robots as a flight platform, so as to significantly reduce a dependence of the robots on the operation environment. Therefore, the UAV can provide a wider range of application possibility to the field of robots.

The UAV 100 includes a housing assembly 10, power assembly 20, and a controlling assembly 30. The power assembly 20 and the controlling assembly 30 are mounted inside the housing assembly 10. The housing assembly 10 is used to protect the power assembly 20 and the controlling assembly 30. The power assembly 20 is used to drive the UAV 100 to fly, and the controlling assembly 30 is used to control the power assembly 20 and to ensure that the UAV 100 completes a flight safely and accurately.

The housing assembly 10 is substantially spherical and includes a first housing 11 and a second housing 12. The first housing 11 and the second housing 12 are connected with each other and cooperatively form a receiving space 13. The receiving space 13 is used to receive the power assembly 20 and the controlling assembly 30.

Figure 5:
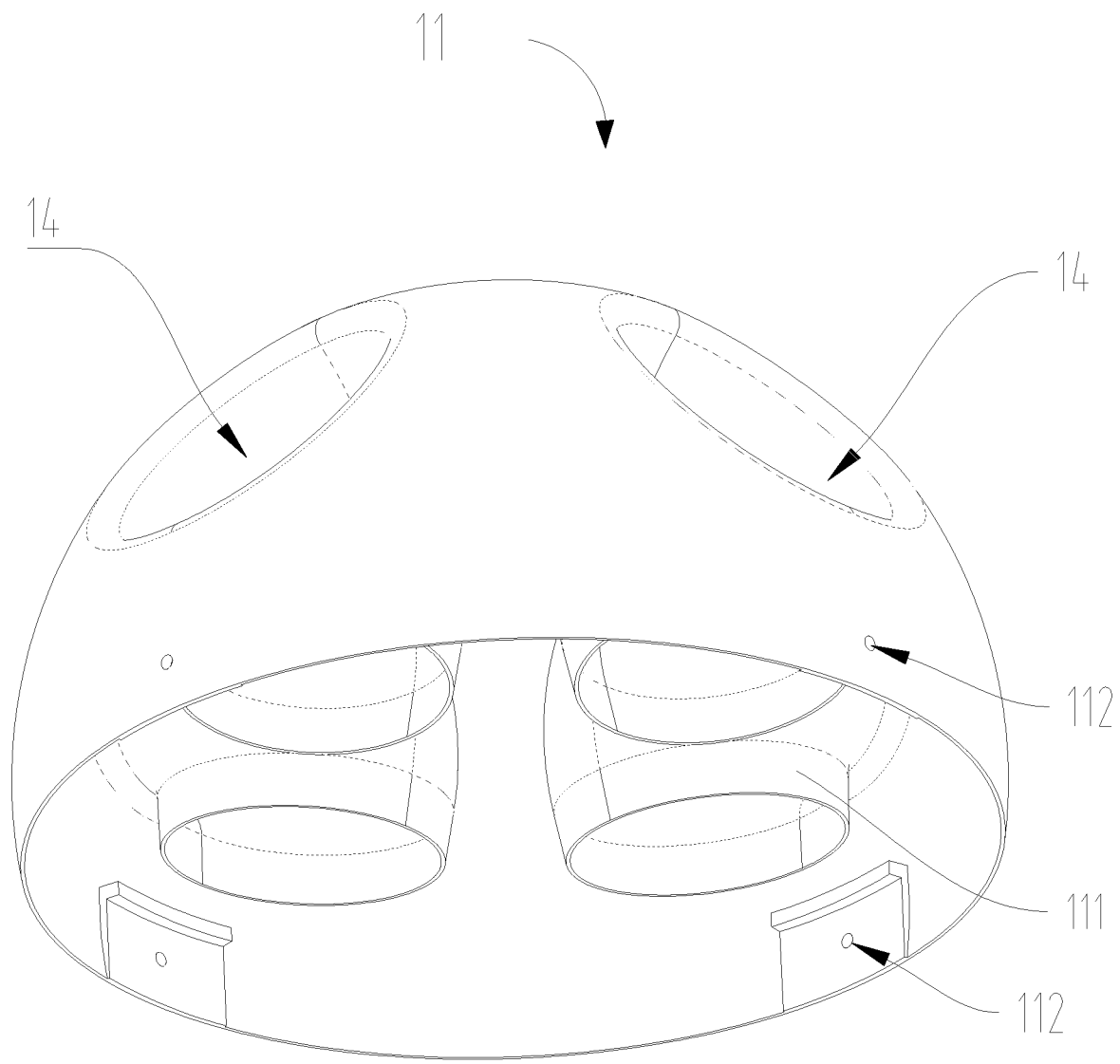
FIG. 5 is a perspective view of the first housing of FIG. 1.

Referring to FIG. 5, the first housing 11 is substantially hemispherical. The first housing 11 is provided with a first duct 111, the first duct 111 is substantially tubular with two opening ends. One end of the duct 111 is connected to the first housing 11, and a round chamfer is provided between the first duct 111 and the first housing 11. Another end of the duct 111 is connected to the power assembly 20 and a second duct 121 in the second housing 12. The first duct 111, the power assembly 20, and the second duct 121 cooperatively form a flow passage 14.

In the illustrated embodiment, a number of the first duct 111 is four, and the four first ducts 111 are evenly arranged around a side wall of the first housing 11. A central axis of each of the first ducts 111 is inclined with a central axis of the first housing 11, so as to fully utilize the space in the housing assembly 10, and to facilitate the posture adjustment of the UAV 100.

It should be understood that, in an alternative embodiment, the number of the first duct 111 can be one, two, three, or greater than four.

In the illustrated embodiment, in order to enhance the connecting strength between the first duct 111 and the first housing 11, the first duct 111 and first housing are integrally formed. It should be understood that, in an alternative embodiment, the first duct 111 and the first housing 11 can be separated with each other. In this case, the first duct 111 and the first housing 11 are two parts that are independent to each other, and the first duct 111 and the first housing 11 can be fixed with each other via screwing, riveting, gluing, welding, or the like. An opening of the first duct 111 penetrates the first housing 11, thereby connecting an inside of the first duct 111 to the outside of the first housing 11, so as to ensure that sufficient airflow can be transmitted to the outside through the second duct 121 by a wind field generated by the power assembly 20, thereby generating an air thrust.

The second housing 12 is also substantially hemispherical and is connected to the first housing 11, and a radius of the second housing 12 is substantially equal to a radius of the first housing 11. The second housing 12 is provided with the second duct 121 corresponding to the first duct 111. The first duct 111, the power assembly 20, and the second duct 121 cooperatively form the flow passage 14. Both ends of the flow channel 14 communicate with the outside, the power assembly 20 in the flow passage 14 compresses the air and ejects it, thereby achieving the flight operation of the UAV 100.

According to the illustrated embodiment, the number of the second duct 121 is also four, each of the first ducts 111 is airtightly connected to one of the second ducts 121, and the four second duct 121 and the four first duct 111 are connected via a fixing board 15 to form four flow passages 14. The four second ducts 121 are evenly arranged around a side wall of the second housing 12. A central axis of each of the second ducts 121 is inclined with a central axis of the second housing 12, so as to increase the space utilization of the UAV 100 and to facilitate the posture adjustment of the UAV 100. Since an opening of the second duct 121 penetrates the second housing 12, the second duct 121 is in communication with the outside of the second housing 12, so as to ensure that the wind field generated by the power assembly 20 can flow to the outside, thereby generating the air thrust.

It should be noted that, the number of the second duct 121 is not limited to four. In an alternative embodiment, the number of the second duct 121 can be one, two, three, or greater than four, as long as the number of the second duct 121 corresponds with the number of the first duct 111.

In the illustrated embodiment, the first housing 11 is firmly connected to the second housing 12. The first housing 11 defines a through hole 112 that penetrates through the first housing 11. A portion of the second housing 12 extends along a direction of the central axis of the second housing 12 and forms a protrusion 122. The protrusion 122 defines a through hole 123 corresponding to the through hole 112, the through holes 112 and 123 allows for a fastener (not shown) to be inserted in, thereby achieving a firm connecting between the first housing 11 and the second housing 12.

In the illustrated embodiment, the number of the protrusion 122 is four, and each of the protrusions 122 defines a through hole 123. The four protrusions 122 are annularly arranged along a periphery of a top surface of the second housing 12. It should be understood that, in an alternative embodiment, the number of the protrusions 122 can be one, two, three, or greater than four. Each of the protrusions 122 can define more than one through hole 123, as long as a fixed connection between the first housing 11 and the second housing 12 is achieved.

It should be understood that, in an alternative embodiment, the fixed connection between the first housing 11 and the second housing 12 can be achieved via screwing, riveting, gluing, welding, or the like.

In the illustrated embodiment, the spherical housing assembly 10 is composed of two hemispherical housings, the first housing 11 and the second housing 12. It should be understood that, in an alternative embodiment, the housing assembly 10 can be formed by splicing more than two arc panels, as long as the spherical shape of the housing assembly 10 is achieved.

The housing assembly 10 further includes a fixing board 15 configured to hold and fix the controlling assembly 30. In the illustrated embodiment, the fixing board 15 is provided in the first housing 11. It should be understood that, in an alternative embodiment, the fixing board 15 can be provided in the second housing 12.

In the illustrated embodiment, the second housing 12 is further provided with a power interface 124 and a switch 125. The switch 125 is used for a user to manually control the UAV 100 to turn on/off. The power interface 124 is used to connect a wire medium to the UAV 100, so as to charge the UAV 100. It should be understood that, the switch 125 and the power interface 124 can be provided on the first housing 11, as long as the corresponding functions can be performed.

It should be understood that, besides the power interface 124 and the switch 125, in an alternative embodiment, the housing assembly 10 can be further provided with other functional structures, such as an illumination lamp and a shock absorber.

Figure 6:
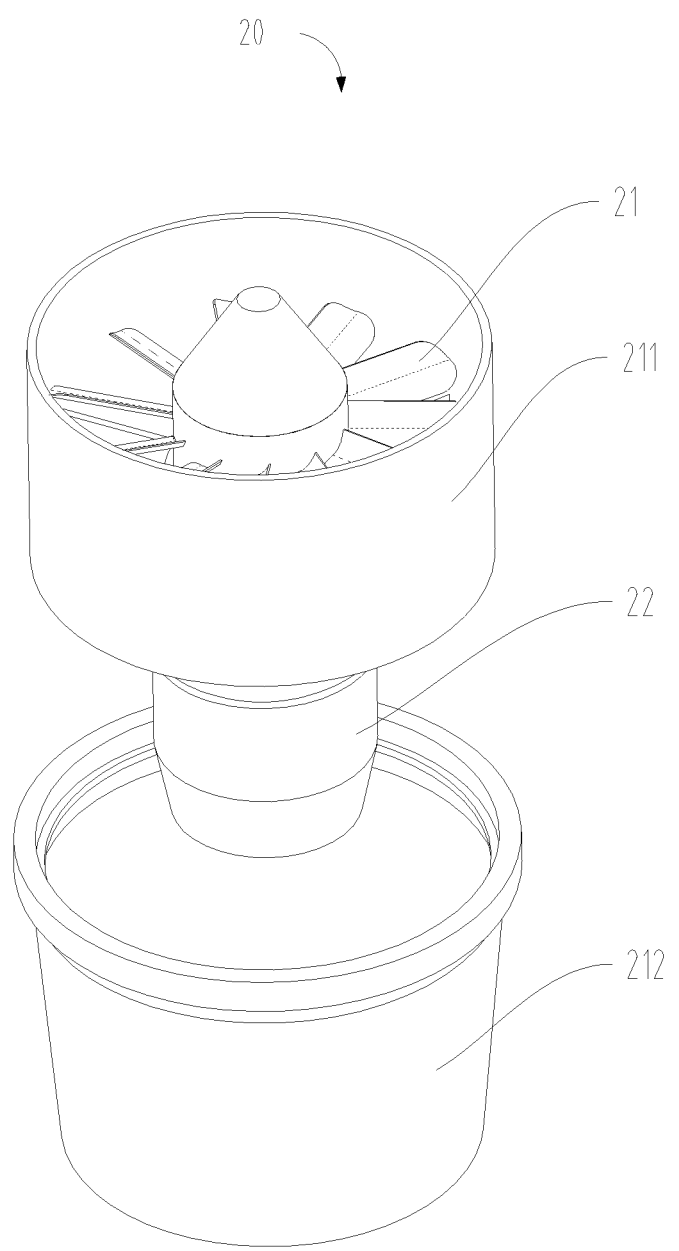
FIG. 6 is a perspective view of the power assembly of FIG. 1.

Referring to FIG. 6, the power assembly 20 is mounted in the flow passage 14 and connected to the fixing board 15, which is used to support and fix the power assembly 20. The power assembly 20 includes a propeller 21, a driving element 22, and a nozzle 212. The driving element 22 is used to drive the propeller 21 to rotate and generate the air thrust. The nozzle 212 is mounted on the propeller 21. The nozzle 212 has a substantially conical shape, one end of which is connected to a frame 211, and the other end points outward in the direction of the central axis of the flow passage 14 and is partially exposed from the flow passage 14. An inner diameter of the end of the nozzle 212 connected to the frame 211 is greater than an inner diameter of the other end, and the inner diameter of the nozzle 212 is gradually decreased along the direction of the central axis of the flow passage 14. The nozzle 212 is used to collect and rectify the air generated by the rotating of propeller 21, so as to improve the dynamic performance of an outlet of the propeller 21. The air is outwardly ejected from the flow passage 14, so as to achieve the flight operation of the UAV 100.

In the illustrated embodiment, the driving element 22 is an electric motor. It should be understood that, the driving element 22 can be other power element, such as a hydraulic motor.

In the illustrated embodiment, the numbers of the propeller 21 and the driving element 22 are both four, and each of the propellers 21 and each of the driving elements 22 are mounted in one of the flow passages 14. Providing four propellers 21, driving elements 22, and the flow passage 14 is advantageous in reducing the manufacturing cost while ensuring the flight performance of the UAV 100. It should be understood that, the numbers of the propeller 21 and the driving element 22 can be one, two, three, or greater than four, as long as the number is identical to the number of the flow passage 14.

The power assembly 20 further includes a power source (not shown) coupled to the driving element 22. The power source is used to supply energy to the driving element 22. The power source is coupled to the power interface 124 of the housing assembly 10, through which the power source can be charged via a wire medium or a desktop charger. In the illustrated embodiment, the power source is a battery. It is to be understood that, in an alternative embodiment, the power can be another energy supplying element.

The controlling assembly 30 is mounted on the fixing board 15. The controlling assembly 30 includes a distribution board 31, a flight controller 32, an electronic speed control device 33, a positioning device 34, and a battery 35. The distribution board 31, the flight controller 32, the electronic speed control device 33, and the positioning device 34 are mounted on the fixing board 15 and electrically coupled to the battery 35.

The distribution board 31 is used to divide the electric energy supplied by the battery 35, so as to achieve the energy supply to a plurality of elements. The flight controller 32 is used to control the flight parameters of the UAV 100. The electronic speed control device 33 is used to control the dynamic parameters of the power assembly 20, and the positioning device 34 is used to position a flight position of the UAV 100. The battery 35 is configured to power the distribution board 31, the flight controller 32, the electronic speed control device 33, and the positioning device 34.

In the illustrated embodiment, the positioning device 34 determines the position and height of the UAV 100 via optical flow positioning and ultrasonic height sensor. It should be understood that, in an alternative embodiment, the position of the UAV 100 can be determined by the positioning device 34 via other positioning modules.

The controlling assembly 30 further includes a receiver 36, which is used to receive a controlling signal from the outside. In the illustrated embodiment, the first housing 11 defines a receiving hole 113 for the receiver 36, such that the receiver 36 can perform signal transmission through the receiving hole 113.

The controlling assembly 30 further includes an infrared sensor 37, used to sense the gesture of the user, so as to perform a gesture control. In the illustrated embodiment, the first housing 11 defines an infrared sensing hole 114 for the infrared sensor 37, such that the infrared sensor 37 can sense a user's gesture through the infrared sensing hole 114.

It should be understood that, in an alternative embodiment, the controlling assembly 30 can further include other functional elements besides the foregoing distribution board 31, the flight controller 32, the electronic speed control device 33, the positioning device 34, the battery 35, the receiver 36, and the infrared sensor 37.

According to the UAV 100, since the power assembly 20 is mounted inside the housing assembly 10, the power assembly 20 will not hurt person during the flight, thereby improving the safety performance of the UAV 100 while flying near the ground.

Although the present disclosure is illustrated and described herein with reference to specific embodiments, the present disclosure is not intended to be limited to the details shown. It is to be noted that, various modifications may be made in the details within the scope and range of equivalents of the claims and without departing from the present disclosure. Therefore, the protection scope of the present disclosure shall be subject to the protection scope of the claims.

What is claimed is:

1. An unmanned aerial vehicle, comprising:
a housing assembly having a receiving space;
a power assembly received in the receiving space; and
a controlling assembly received in the receiving space and configured to control the power assembly;
wherein the housing assembly is provided with a flow passage penetrating an inside of the housing assembly, and the power assembly partially forms the flow passage;
wherein the housing assembly includes:
a first housing having a central axis and a first duct, the first duct having a central axis that is inclined relative to the central axis of the first housing;
a second housing connected to the first housing and having a second duct corresponding to the first duct; and
a fixing board carrying the power assembly and the controlling assembly; and wherein the first duct, the second duct, the power assembly, and the fixing board cooperatively form the flow passage penetrating the inside of the housing assembly.

2. The unmanned aerial vehicle according to claim 1, wherein the housing assembly is substantially spherical.

3. The unmanned aerial vehicle according to claim 2, wherein the receiving space is substantially spherical.

4. The unmanned aerial vehicle according to claim 1, wherein the first housing and the second housing are both substantially hemispherical.

5. The unmanned aerial vehicle according to claim 1, wherein the number of the flow passage is four, the four flow passages are annularly arranged in the housing assembly, and a round chamfer is provided between the first duct and the first housing.

6. The unmanned aerial vehicle according to claim 1, wherein the first housing and the second housing are fixed to each other via at least one of the following methods: screwing, riveting, gluing, and welding.

7. The unmanned aerial vehicle according to claim 1, wherein the controlling assembly is mounted on the fixing board.

8. The unmanned aerial vehicle according to claim 1, wherein a central axis of the second duct is inclined with a central axis of the second housing.

9. The unmanned aerial vehicle according to claim 1, wherein the power assembly comprises a propeller, a driving element, and a nozzle, which are mounted in the flow passage; the driving element drive the propeller to rotate, and an airflow generated by the propeller is rectified through the nozzle and ejected outwardly.

* * * * *